United States Patent [19]

Dorner

[11] Patent Number: 4,732,266
[45] Date of Patent: Mar. 22, 1988

[54] BEARING CONSTRUCTION FOR MOUNTING CARRIERS ON AN ENDLESS CHAIN ELEVATOR

[75] Inventor: Wolfgang C. Dorner, Oconomowoc, Wis.

[73] Assignee: Dorner Mfg. Corp., Oconomowoc, Wis.

[21] Appl. No.: 12,956

[22] Filed: Feb. 10, 1987

[51] Int. Cl.[4] ............................................. B65G 17/16
[52] U.S. Cl. ..................................... 198/799; 198/802
[58] Field of Search ................. 198/475.1, 474.1, 799, 198/802, 476.1, 477.1, 468.6

[56] References Cited

U.S. PATENT DOCUMENTS

| | | | |
|---|---|---|---|
| 1,554,100 | 12/1925 | Morton | 440/103 |
| 1,669,060 | 5/1928 | Livingston | 198/799 |
| 2,272,421 | 2/1942 | Miller | 198/802 |
| 2,811,933 | 11/1957 | Prasz | 198/802 X |
| 2,886,166 | 5/1959 | Lens | 198/799 X |
| 3,100,041 | 8/1963 | Sheehan, Jr. | 198/802 X |
| 3,184,039 | 5/1965 | Czarnecki | 198/799 |
| 3,481,449 | 12/1969 | Leach | 198/799 |
| 4,187,801 | 2/1980 | Monk | 198/802 X |
| 4,465,177 | 8/1984 | Dorner | 198/475.1 |

FOREIGN PATENT DOCUMENTS

261933 12/1926 United Kingdom.
741072 11/1955 United Kingdom.

Primary Examiner—Joseph E. Valenza
Assistant Examiner—D. Glenn Dayoan
Attorney, Agent, or Firm—Andrus, Sceales, Starke & Sawall

[57] ABSTRACT

An improved bearing construction for mounting carriers on an endless chain elevator. The elevator comprises a pair of endless chains mounted to travel in parallel offset vertical paths. The opposite corners of a plurality of carriers or platforms are connected to the respective chains by bearing assemblies, and as the chains move in their path of travel the carriers move in a generally rectangular path. Each bearing assembly includes a housing having an axial opening the receives a sleeve. A shaft is journalled within the sleeve and is connected to the respective chain. The sleeve is mounted for both linear and pivoting horizontal movement within the housing so that the sleeve can move horizontally but not vertically to accommodate any misalignment between the two chain drives.

9 Claims, 3 Drawing Figures

BEARING CONSTRUCTION FOR MOUNTING CARRIERS ON AN ENDLESS CHAIN ELEVATOR

BACKGROUND OF THE INVENTION

Automatic conveyor systems are used to convey or route articles between work stations or other locations, and in many conveyor systems it is desirable to move the articles from one vertical level to another.

U.S. Pat. No. 4,465,177 describes an elevator for a conveyor system which consists of a pair of endless chains mounted to travel in parallel offset vertical paths of travel. The opposite corners of a plurality of carriers or platforms are connected to the respective chains by bearing assemblies, and as the chains move in synchronization in their respective paths of travel, the carriers will move in a generally rectangular path consisting of an upward vertical run, an upper horizontal run, a downward vertical run, and a lower horizontal run. With this construction, the carriers will remain in a horizontal attitude at all times in their path of travel.

In the conventional elevators, as used in the past, the carriers are connected to both chain drives, and therefore it is necessary that the chain drives be precisely aligned. However, it is a difficult and costly procedure to precisely align the chain drives. If there is not precise alignment between the drive shafts and sprockets of the two chain drives, the chain links, as well as the pins which connect the bearing assemblies to the chain links, can be subjected to excessive stress.

SUMMARY OF THE INVENTION

The invention is directed to an improved bearing construction for mounting carriers or platforms on an endless chain elevator. In accordance with the invention, bearing assemblies are connected to opposite corners of each carrier or platform and are operably connected to the respective chain drives. Each bearing assembly includes a housing having an axial opening and a sleeve is mounted within the opening. The opening in the housing is generally rectangular in cross section and similarly the outer cross section of the sleeve is rectangular. However, the horizontal dimension of the opening in the housing is greater than the horizontal dimension of the sleeve so that the sleeve can move horizontally relative to the housing.

To prevent axial displacement of the sleeve from the housing, the sleeve is keyed to the housing by a key that extends laterally of the axis of the opening in the housing. The key is provided with a lesser width than the mating keyway to permit the sleeve to tilt or pivot in a horizontal plane.

Journalled within the sleeve is a shaft and a pair of pins are connected to the shaft and the pins in turn are connected to the roller links of the respective chain.

With the bearing construction of the invention, the sleeve and shaft, which is connected to the chain, are permitted to move horizontally with respect to the carrier or platform, and both linear and pivoting horizontal movement can be affected. The bearing assemblies thus compensate for any misalignment in the chain drives and eliminate the need for costly and precise alignment of the chain drives.

While the bearing assemblies permit horizontal movement, they do not allow any appreciable vertical movement between the carriers and the chain drives to thereby maintain the stability of the carriers during their travel.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
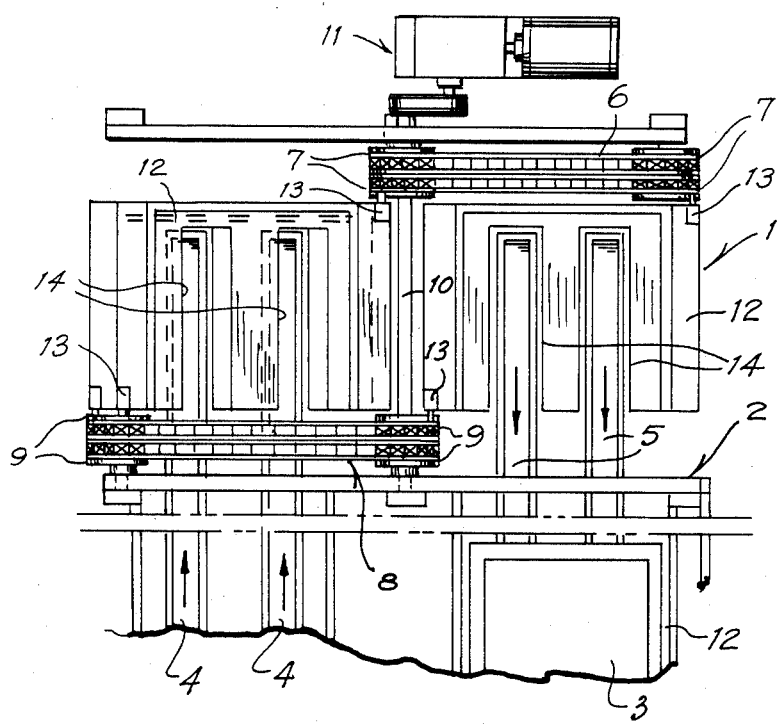
FIG. 1 is a plan view of an elevator or a conveyor system utilizing the bearing construction of the invention.

FIG. 1 illustrates an elevator for a conveyor system as described in U.S. Pat. No. 4,465,177, and the construction of the elevator of that patent is incorporated herein by reference.

The elevator 1 is mounted on a frame or supporting structure 2 and articles 3 are conveyed in succession to elevator 1 on a pair of spaced belt conveyors 4. After being elevated, articles 3 are discharged from the elevator 1 on a pair of spaced belt conveyors 5 which are located at a higher elevation than conveyors 4.

As described in U.S. Pat. No. 4,465,177, elevator 1 is composed of a double strand roller link chain 6 which is mounted to travel in an endless path on a plurality of sprockets 7, only two pair of which are shown in FIG. 1. As described in U.S. Pat. No. 4,465,177, the sprockets 7 are preferably disposed in a rectangular path so that chain 6 will correspondingly move in a rectangular path of travel.

A second double strand roller link chain 8 is mounted to travel in an endless path on a plurality of sprockets 9, and the path of travel of chain 8 is offset and parallel to the path of travel of chain 6, as shown in FIG. 1. One of the upper sprocket pairs 7 is mounted on a common shaft 10 with one of the sprocket pairs 9 and shaft 10 is driven by a drive mechanism indicated generally by 11, as described in the aforementioned patent.

A plurality of platforms or carriers 12 have their opposite corners connected to the respective chains 6 and 8 by bearing assemblies 13. Carriers 12 are provided with parallel slots 14 which receive the conveyor belts 4 and 5 as the platforms move in their path of travel.

As described in the aforementioned patent, the articles 3 are moved onto the elevator on conveyor belts 4, and a carrier 12, moving in an upward run will pick the article 3 from the conveyors 4 and move the article to the top of the elevator, then horizontally and then downward in a downward vertical run. As the carrier 12 carrying the article passes downwardly toward the conveyors 5, the article will be deposited on the conveyors 5.

With the construction as described, movement of the chains 6 and 8 will cause the carriers to move in an upward vertical run, an upper horizontal run, a downward vertical run and a lower horizontal run and the carriers will be maintained in a horizontal attitude throughout the entire path of travel.

As each of the carriers 12 is connected to both of the chains 6 and 8, any misalignment of the shafts or sprockets of the two chain drives can cause undue stress on the chain drives or on the pins that connect the carriers to the chain drives. The bearing assemblies 13 of the invention provide a construction which will accommodate misalignment in the two chain drives to prevent excessive stress being applied to the driving components.

Each bearing assembly includes a generally U-shaped housing 15 which is anchored to the upper surface of carrier 12 by screws 16. Housing 15 is provided with a generally rectangular axial opening 17 and a sleeve 18 having a corresponding rectangular outer configuration is mounted within opening 17.

Figure 3:
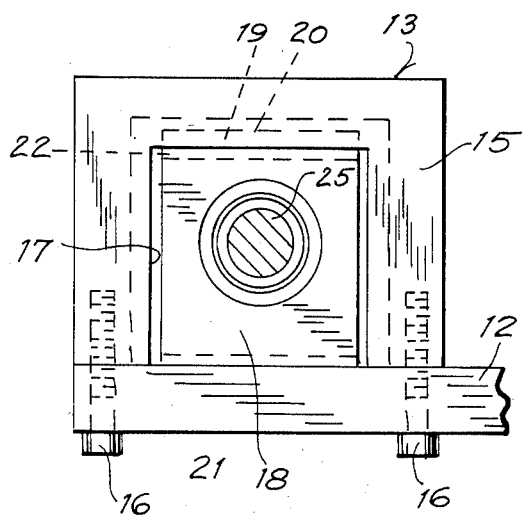
FIG. 3 is a view taken along line 3—3 of FIG. 2.

As best illustrated in FIG. 3, the width or horizontal dimension of opening 17 is greater than the width of sleeve 18 so that sleeve 18 can move or shift horizontally relative to housing 15.

Figure 2:
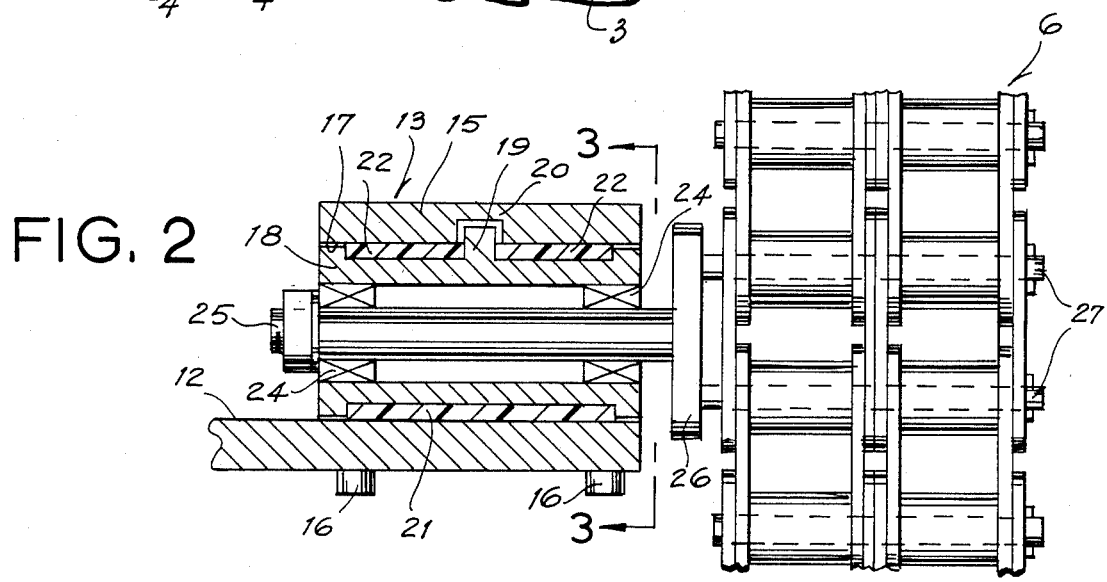
FIG. 2 is an enlarged view with parts broken away in section showing the connection of the bearing assembly to the chain drive.

To prevent axial displacement of sleeve 18 from opening 17, the outer surface of sleeve 18 is provided with a key 19 that extends transversely of the sleeve, and is received within a keyway 20 formed in the inner surface of housing 15. As shown in FIG. 2, key 19 has a lesser width than keyway 20 to permit the sleeve 18 to pivot or tilt relative to housing 15 in a horizontal plane.

As sleeve 18, is adapted to slide relative to housing 15 in a horizontal plane, the lower surface of sleeve 18 is provided with a recess which receives a wear plate 21 formed of nylon or other material having a low coefficient of friction. Similarly, the upper surface of sleeve 18 is provided with a pair of recesses which receive wear plates 22. During use, wear plates 21 and 22 will slide against the upper surface of carrier 12 and against the inner surfaces of housing 15, respectively.

Located at opposite ends of the axial opening in sleeve 18 is a pair of needle bearings 24, and shaft 25 is journalled within bearing 24. As shown in FIG. 2, the outer end of shaft 25 carries a bar 26 and parallel pins 27 are connected to bar 26 and in turn are connected to the respective roller link chains, as shown in FIG. 2.

If there is any misalignment between the two chain drives 6 and 8, each sleeve 18 can move relative to the respective housing 15, either in the linear horizontal path or in a pivoting horizontal path, to accommodate misalignment. However, the bearing construction will not permit any appreciable vertical movement of sleeve 18 relative to housing 15 and carrier 12 to thereby maintain the stability of the carriers.

Various modes of carrying out the invention are contemplated as being within the scope of the following claims particularly pointing out and distinctly claiming the subject matter which is regarded as the invention.

I claim:

1. In an elevator for a conveyor system, said elevator having a first endless chain disposed to travel in a first generally rectangular path of travel, a second chain disposed to travel in a second generally rectangular path of travel, said second path of travel lying in a plane parallel to said first path of travel and offset from said first path of travel, a plurality of carriers adapted to support articles to be conveyed, bearing assemblies disposed at only two opposed corner portions of each carrier for pivotably connecting each carrier to the respective endless chains, drive means to drive the chains in synchronization, each bearing assembly including a housing having an axial opening, a sleeve disposed within the opening, shaft means connected to one of said chains and journalled with the opening, and means for permitting relative horizontal movement between said sleeve and said housing to thereby accommodate any misalignment between said chains.

2. The elevator of claim 1, wherein said sleeve has a generally rectangular outer cross section and said opening has a rectangular cross section, the horizontal dimension of the opening being greater than the horizontal dimension of the outer cross section of said sleeve to thereby permit said sleeve to move horizontally relative to said housing.

3. The elevator of claim 1, and including means for preventing axial displacement of said sleeve from the housing, said means for preventing axial displacement being constructed and arranged to permit limited pivotal movement of said sleeve within the housing in a horizontal plane.

4. The elevator of claim 3, wherein said means for preventing axial displacement comprises a key disposed on one of said sleeve and said housing and a keyway disposed on the other of said sleeve and said housing, said keyway extending laterally of the axis of said sleeve.

5. The elevator of claim 4, wherein said key has a lesser width than said keyway to permit said sleeve to pivot in a horizontal plane relative to said housing.

6. The elevator of claim 1, wherein said shaft means comprises a shaft journalled within said sleeve and a pin connected to the shaft, said pin being connected to said chain.

7. The elevator of claim 6, and including a pair of parallel pins connected to said shaft with said pins being rotatably connected to adjacent links of said chain.

8. In an elevator for a conveyor system, said elevator comprising a first endless chain disposed to travel in a first path of travel, a second endless chain disposed to travel in a second path of travel, said second path of travel lying in a plane parallel to said first plane of travel and offset from said first path of travel, a plurality of carriers adapted to support articles to be conveyed, bearing means disposed at only two opposite corner portions of each carrier for pivotally connecting said carrier to the respective chains, drive means to drive the chains in synchronization, each bearing means comprising a housing having an axial opening of generally rectangular cross section, a sleeve disposed within said opening and having an outer generally rectangular configuration, the transverse horizontal dimension of said opening being greater than the transverse horizontal dimension of said sleeve to permit said sleeve to move horizontally relative to said housing, means for preventing axial displacement of said sleeve from said housing, said means for preventing axial displacement being constructed and arranged to permit limited pivotal movement of said sleeve within said opening in a horizontal plane, and shaft means connected to the chain and journalled within said sleeve, said sleeve being capable of moving linearly in a transverse horizontal plane and pivoting in said horizontal plane relative to said housing to accommodate any misalignment between said chains.

9. The elevator of claim 8, wherein said means for preventing axial displacement comprises a key on said sleeve and extending transversely of the axis of said sleeve, and a keyway in said housing bordering said opening and disposed to receive said key, said keyway having a greater width than said key to permit said sleeve to pivot relative to said housing in said horizontal plane.

* * * * *